US008787357B2

(12) United States Patent
Rawat et al.

(10) Patent No.: US 8,787,357 B2
(45) Date of Patent: *Jul. 22, 2014

(54) METHOD TO IDENTIFY VOICE OVER PACKET DEVICE CAPABILITY AND USE IT TO MAKE APPROPRIATE CALLS WITH OTHER CLIENT DEVICES

(75) Inventors: Vikram Kumar Rawat, Concord, CA (US); Derek Hongwei Bao, Concord, CA (US)

(73) Assignee: Cellco Partnership, Basking Ridge, NJ (US)

( * ) Notice: Subject to any disclaimer, the term of this patent is extended or adjusted under 35 U.S.C. 154(b) by 195 days.

This patent is subject to a terminal disclaimer.

(21) Appl. No.: 13/082,938

(22) Filed: Apr. 8, 2011

(65) Prior Publication Data
US 2011/0188456 A1 Aug. 4, 2011

Related U.S. Application Data

(63) Continuation of application No. 11/114,187, filed on Apr. 26, 2005, now Pat. No. 7,944,896.

(51) Int. Cl.
*H04L 12/66* (2006.01)

(52) U.S. Cl.
USPC ............................ 370/352; 370/271; 455/518

(58) Field of Classification Search
None
See application file for complete search history.

(56) References Cited

U.S. PATENT DOCUMENTS

| 7,221,959 | B2 | 5/2007 | Lindqvist et al. |
| 7,245,940 | B2 | 7/2007 | Serbin et al. |
| 7,428,422 | B2 | 9/2008 | Hannu et al. |
| 7,529,540 | B2 | 5/2009 | Cox et al. |
| 2004/0009761 | A1 | 1/2004 | Money et al. |
| 2004/0187109 | A1 | 9/2004 | Ross et al. |
| 2004/0196826 | A1 | 10/2004 | Bao et al. |
| 2004/0219940 | A1 | 11/2004 | Kong et al. |
| 2004/0224710 | A1 | 11/2004 | Koskelainen et al. |
| 2005/0041625 | A1 | 2/2005 | Brewer |
| 2006/0094455 | A1* | 5/2006 | Hannu et al. ................. 455/518 |
| 2006/0104293 | A1* | 5/2006 | Kopp et al. .................. 370/401 |

OTHER PUBLICATIONS

Entire Prosecution of U.S. Appl. No. 11/114,187 to Rawat, et al., filed Apr. 26, 2005, entitled "Method to Identify Voice Over Packet Device Capability and Use it to Make Appropriate Calls With Other Client Devices" (as amended).

* cited by examiner

*Primary Examiner* — Chirag Shah
*Assistant Examiner* — Jenkey Van

(57) ABSTRACT

A system provides push-to-talk (PTT) or similar communication service via a radio access network providing wireless mobile packet data communications for mobile stations. A server distributes packets of digitized audio received from a broadcasting mobile station to one or more client devices of other parties. The called client device(s), however, may not all have the same communications capabilities as the broadcasting mobile station. Signaling procedures are adapted to inform the broadcasting station of the capabilities of the other client device(s). This enables the broadcasting mobile station to configure its transmissions of digitized audio through the network for compatibility with the capabilities of the other client device(s). Proper configuration avoids loss of data at the destination, particularly at the start of a PTT transmission, due to transmission in a form or configuration that may be incompatible with one or more of the receiving stations.

17 Claims, 6 Drawing Sheets

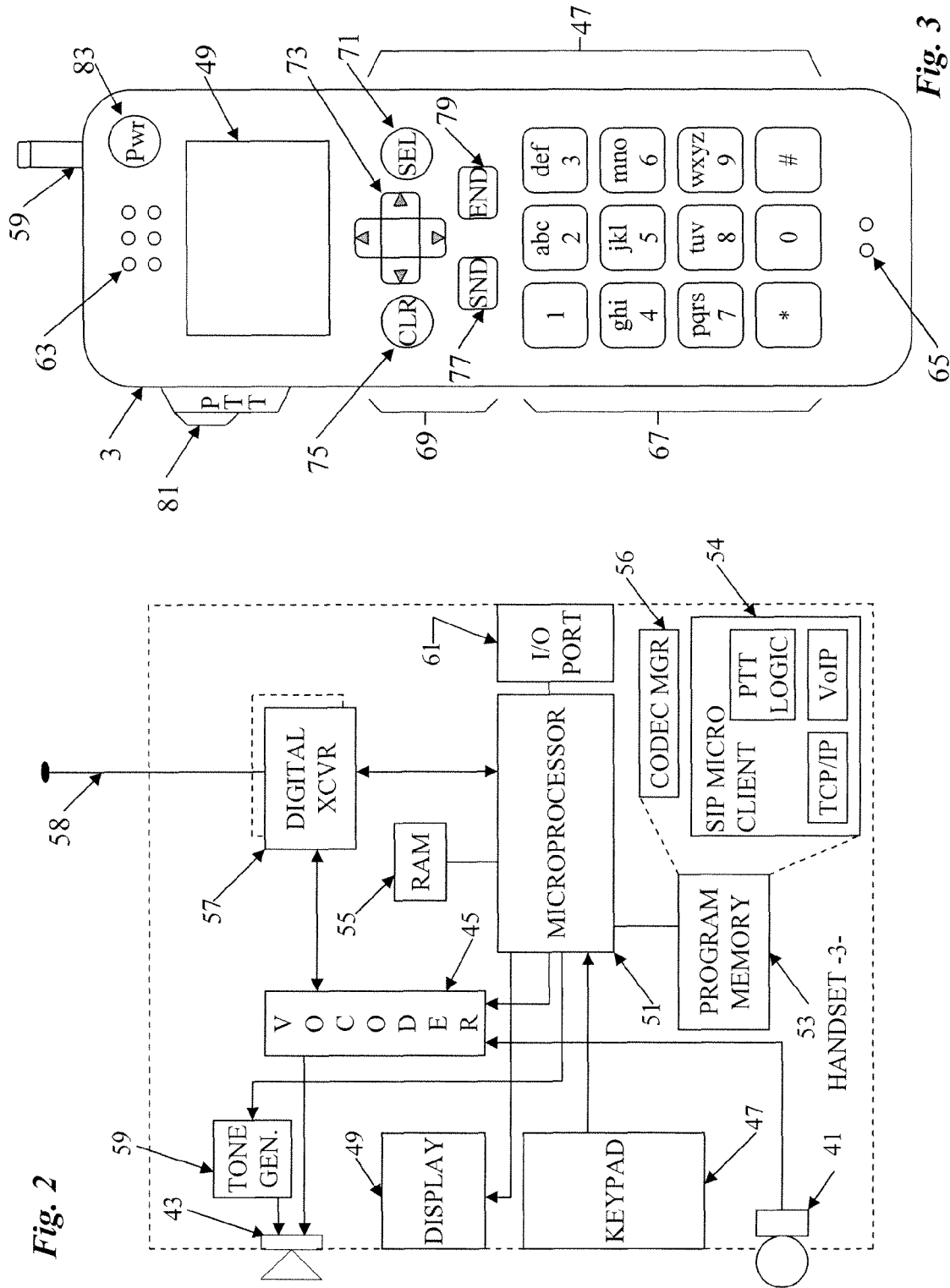

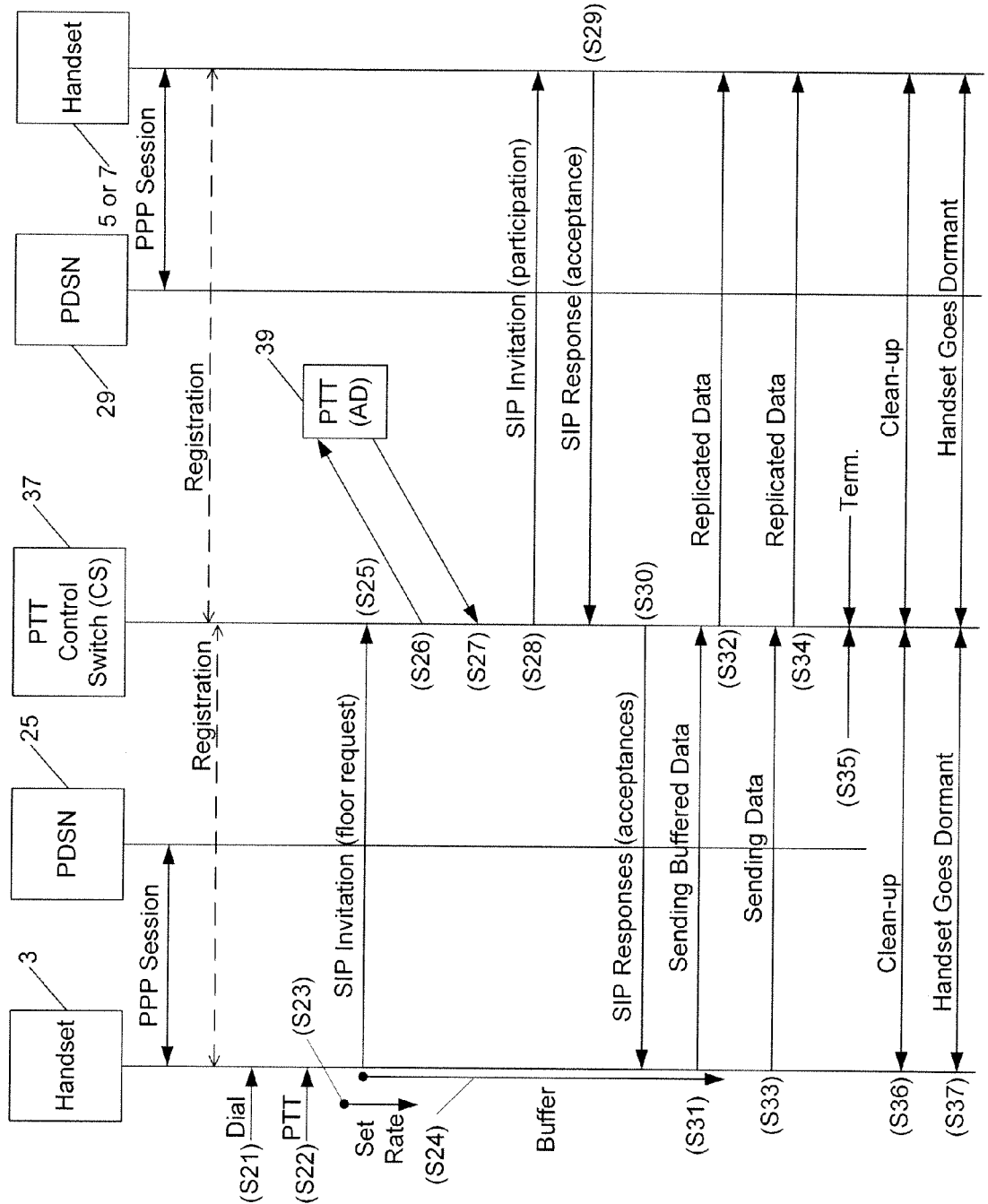

METHOD TO IDENTIFY VOICE OVER PACKET DEVICE CAPABILITY AND USE IT TO MAKE APPROPRIATE CALLS WITH OTHER CLIENT DEVICES

RELATED APPLICATIONS

This application is a Continuation of U.S. patent application Ser. No. 11/114,187 filed Apr. 26, 2005, now U.S. Pat. No. 7,944,896 the disclosure of which is incorporated entirely herein by reference.

TECHNICAL FIELD

The present subject matter relates to techniques and equipment to allow mobile stations and/or other client devices of subscribers to a push-to-talk (PTT) or similar type voice over data-packet type service to exchange information regarding each device's relevant communication capability, to allow a sending mobile station to adjust its operations to match the capabilities of one or more of the intended recipients' client devices.

BACKGROUND

In recent years, push-to-talk communications have become popular in the context of mobile or cellular type wireless communications. A conventional push-to-talk (PTT) communication utilizes two or more radio transceiver stations, all tuned to the same channel. When not transmitting, the transceivers receive any signal carried over the channel and supply any received audio to the users. A user wishing to speak pushes a button, which causes that user's transceiver to broadcast audio over the common channel to the other transceiver(s) that share the channel. However, many modern public cellular communication systems have migrated to digital communication technologies, and increasingly, such modern systems use packet-based communication to support push-to-talk communication.

A packet-switched network routes each packet individually through the network, although not necessarily through a common path; as opposed to the traditional circuit switched approach to telephone service and the like that provides a path through the network for the duration of the communication session. Packet switching uses a standard packet protocol, such as the Internet Protocol (IP). The routing decision regarding each packet's next hop through the packet switched network is made on a hop-by-hop basis (typically between neighboring switching or routing nodes). The wireless data services, for example, support a range of communication applications utilizing two-way packet-switched packetized data, such as browsing, instant messaging, e-mail and the like.

As the speeds of packet-switched communications equipment and the speed of processors have increased, a variety of applications have emerged that utilize IP packet transport as an alternative bearer for voice communications. Such applications are often referred to as "Voice over IP" (VoIP) services. VoIP services are now migrating onto the packet transport networks deployed for the wireless domain.

Of note for purposes of this discussion, a number of carriers are now offering push-to-talk services using VoIP and IP packet type data transport (see e.g. U.S. Patent Application Publication No. 2004/0196826 to Bao et al.). A VoIP implementation of a push-to-talk service utilizes separate packet links for the user devices and a dispatch application on a server. The sender station uses its link through the wireless packet data service to upload the sender's audio information to the server. Each destination station obtains the data from the server via its packet service link; and each receiving station converts the data back to audio for output. The destination station or stations may be similar mobile stations or data devices of various other types communicating with the server via the wireline packet data network.

The technology of mobile stations, and thus the communications they support, are rapidly advancing. A provider's customers may be using stations sold over a period of several years, and the capabilities or features supported by those stations may vary widely with model, brand and age. The carriers also are constantly upgrading the technology deployed in their mobile communication networks. Variations in capabilities raise compatibility issues for push-to-talk and similar types of VoIP wireless communications.

For example, an existing Push-to-talk service deployment uses Session Initiation Protocol (SIP) for set-up of VoIP communications over CDMA wireless links, with a half-rate (4 kbps) vocoder capability to package voice data frames over a 9.6 kbps bearer channel. The rest of the 9.6 kbps bandwidth is used for packet header data and other overhead. With a newly deployed network CDMA service option (SO) 60, it is possible to remove the header from packet data. This reduces overhead, and allows an increase in the voice quality of the VoIP service by increasing the vocoder rate to 8 kbps ("full-rate"). Some implementations also provide voice buffering at the mobile station and/or voice buffering at the push-to-talk server. With voice buffering, the user can instantaneously start speaking after pressing the push-to-talk button, before the network sets-up the SIP session(s) with the recipient(s). Voice packets are stored in the mobile station or at the server. Upon receiving positive acknowledgement from the terminating mobile station(s), these buffered voice packets will then be forwarded to the terminating mobile station(s).

When voice buffering is used, the voice packets are formed in the originating mobile station and stored in that station or in the server, without the knowledge of the capability of the terminating mobile station or other recipient client device. This creates an issue when trying to interoperate new mobile stations with SO60 capability (no header and capable of full-rate 8 kbps vocoder operation) with existing half-rate mobile stations. For example, the buffered voice data may be encoded at 8 kbps, even though the destination mobile station may only be expecting 4 kbps. In such a case, the legacy mobile station cannot process the higher rate data, and audio is lost unless and until the receiving station can advise the sending station to adjust its transmissions down to half-rate vocoding.

One solution might be to have a database listing of PTT subscribers' mobile stations, for example by electronic serial numbers (ESNs), at the push-to-talk server. The server could then instruct the mobile stations to utilize a compatible set of operating functions, e.g. to all use half-rate voice encoding and decoding to allow interoperation with older stations that only support half-rate vocoder functions. However, every time a user changed and upgraded her or his mobile station, the service provider would need to manually update the database, often by manual database provisioning. Such a process requires frequent and error prone changes to the database.

Hence a need exists for a more efficient and effective technique to inform stations of each others' capabilities and determine a capability (e.g. vocoder rate) that can be used on a particular session and will be compatible with all of the mobile stations involved in the VoIP session for push-to-talk or the like.

SUMMARY

The teachings herein provide techniques, as well as equipment and software for implementing those techniques, which identify a client device's capability at an appropriate point in normal operations, e.g. each time that the device logs-in with the server. Information identifying the client device's communication capability, e.g. for a VoIP communication, can be distributed to client devices of other push-to-talk customers as needed, e.g. to mobile stations of persons on the user's group or buddy list or to the mobile station of an ad hoc called or calling party (for use on a latter PTT call). This enables a sending mobile station to configure its transmissions of digitized audio through the network for compatibility with the capabilities of the mobile station or other client device expected to receive the transmission. For example, this data allows a sending mobile station to determine the appropriate packet data communication features (service option, vocoder rate, etc.) that it can use when initiating a transmission.

The present teachings encompass methods that may be implemented from the perspective of a service provider, e.g. at a server or other element coupled to a mobile wireless communication network, as well as methods that may be implemented in client devices such as handsets or other types of mobile stations.

One such call processing method, for set-up of a group voice call over packet communication in a radio access network, involves receiving registration information from a client device of a subscriber. From the received registration information, a communication capability of the client device is identified, and information as to the client' device's capability is communicated through the radio access network to a mobile station of a subscriber. The method also involves receiving encoded voice packet information from the mobile station and forwarding the voice packet information to the client device. The mobile station will be able to communicate the voice packet information through the radio access network in a manner that is compatible with the communication capability of the client device.

From the perspective of a sending mobile station, a method of transmitting digitally encoded audio for communication to a client device entails registering the mobile station with equipment of a provider of a voice over packet communication service and receiving information indicating a communication capability of the client device, from the equipment of the service provider. The mobile station can then determine a communication configuration that is compatible with the communication capability of the client device, from the received information. The method also entails transmitting packets of digital audio information through a mobile wireless communication network, for communication to the client device. This transmission uses the communication configuration that is compatible with the communication capability of the client device.

In a push-to-talk (PTT) group communication example, the capability information regarding each on-line PTT group member's client device is automatically updated as other client devices come on-line and register. Mobile stations and other client devices that are logged-in also automatically receive the information, e.g. at registration or during list updates, so that it is available for use before an actual push-to-talk transmission begins. Hence, the service provider does not need to manually maintain a database of station capabilities. However, when a client device imitates a PTT transmission, it can use a configuration that is compatible with the capabilities of the other on-line client device or devices, e.g. of the sender's PTT group.

For ad hoc calling, where one PTT user dials another user (manually or automatically) to initiate a session, the server can provide an exchange of capability information at the end of a session. During that first session, the client devices use a default setting. However, in a later session, the broadcasting station can select a configuration that is compatible with the other client device.

Assume for example that a user's mobile station supports full-rate vocoding with SO60 or half-rate vocoding. During registration, the mobile station will inform the push-to-talk server of its capability, and the push-to-talk server will store and forward the capability to each mobile station of the user's group of buddies or to another client device with which the station conducts an ad hoc PTT call. The server will also store similar information regarding the other mobile stations in the group or any other station with which the one station communicates and pass this information back to the user's station. If the mobile station with a new feature set interacts with a mobile station having similar capabilities, e.g. SO60 capability and full-rate vocoder capability, the user's mobile station will automatically package and buffer frames at the full rate. However, if the mobile station with the new feature set interacts with a mobile station having only legacy half-rate vocoder capability, then the sending station can package and buffer frames at the half-rate. When interacting with a plurality of other stations, the user's mobile station will select the capabilities, vocoder rate and service option in our example, that are commonly supported by all of the stations that will participate in the session.

A mobile station for implementing such operations will typically include a variable rate vocoder for digital encoding of audio and decoding received digitized audio, a wireless transceiver for two-way communication of packets containing encoded audio via the mobile wireless communication network, and a controller. A memory stores a program; and the controller controls the vocoder and the transceiver in accordance with the stored program. In particular, the program configures the mobile station to implement the technique for communicating with the service provider to obtain information as to communication capabilities of other client devices and to use that capability information to establish a transmission configuration that is compatible with the other client devices.

A system for providing push-to-talk (PTT) communication service might include a server and a radio access network for providing wireless mobile packet data communications for mobile stations. The server distributes packets of digitized audio received from a broadcasting mobile station of a member of a PTT group to mobile stations of other members of the PTT group. The system also includes an element for determining a communication capability of each of the mobile stations of the other members of the PTT group. This element communicates information as to the capabilities of the other mobile stations to the broadcasting mobile station. This enables the broadcasting mobile station to configure its transmissions of digitized audio through the radio access network for compatibility with the capabilities of the mobile stations of the other members of the PTT group.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, FIG. 1 is a functional block diagram of a radio access network providing telephone service, packet data service and voice over IP type packet service for a push-to-talk application or the like.

FIG. 2 is a functional block diagram of a mobile station that may operate in the network of FIG. 1.

FIG. 3 is an exemplary front plan view of a mobile station, such as the station shown in functional diagram form in FIG. 2.

FIG. 6 is a simplified signal flow diagram useful in understanding a PTT communication, set-up on an ad hoc dial-up basis between two mobile stations, through the network of FIG. 1.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

As outlined above, information identifying a client device's communication capability, e.g. for a push-to-talk (PTT) communication through a wireless network, can be distributed to one or more client devices of other parties with whom a user might conduct a PTT session, e.g. to another station with which the device conducts a PTT call session or to mobile stations or other client devices of persons on a user's group or buddy list. The client device similarly receives capability information regarding one or more of the other client devices. This enables a broadcasting mobile station to configure its transmissions of digitized audio through the network for compatibility with the capabilities of the mobile station(s) or other client device(s) of other participant(s) in a PTT session. In PTT examples discussed in detail below, this data allows a sending mobile station to determine the appropriate packet data communication features (service option, vocoder rate, etc.) that it can use when initiating a transmission to the other device(s) that may participate in the push-to-talk session.

The capability information regarding each push-to-talk user's mobile station is automatically updated, e.g. without manual database maintenance. In the examples, updated capability information is collected at registration with the PTT service. Information as to capabilities of other on-line client devices of group members may be distributed at registration and may be updated from time to time as other client devices of a group or buddy list come on-line, much like distributing and updating information as to on-line members of a list for instant messaging. Where the users are not members of a pre-defined group or list, the server may provide the capability information at the end of a session between devices, for use in a later PTT session between the same client devices. In such a case, the stations use default parameters for the first session, store the information received at the end of the session, and then the broadcasting station can use the information to select an appropriate configuration for the next PTT call between the stations.

Figure 1:
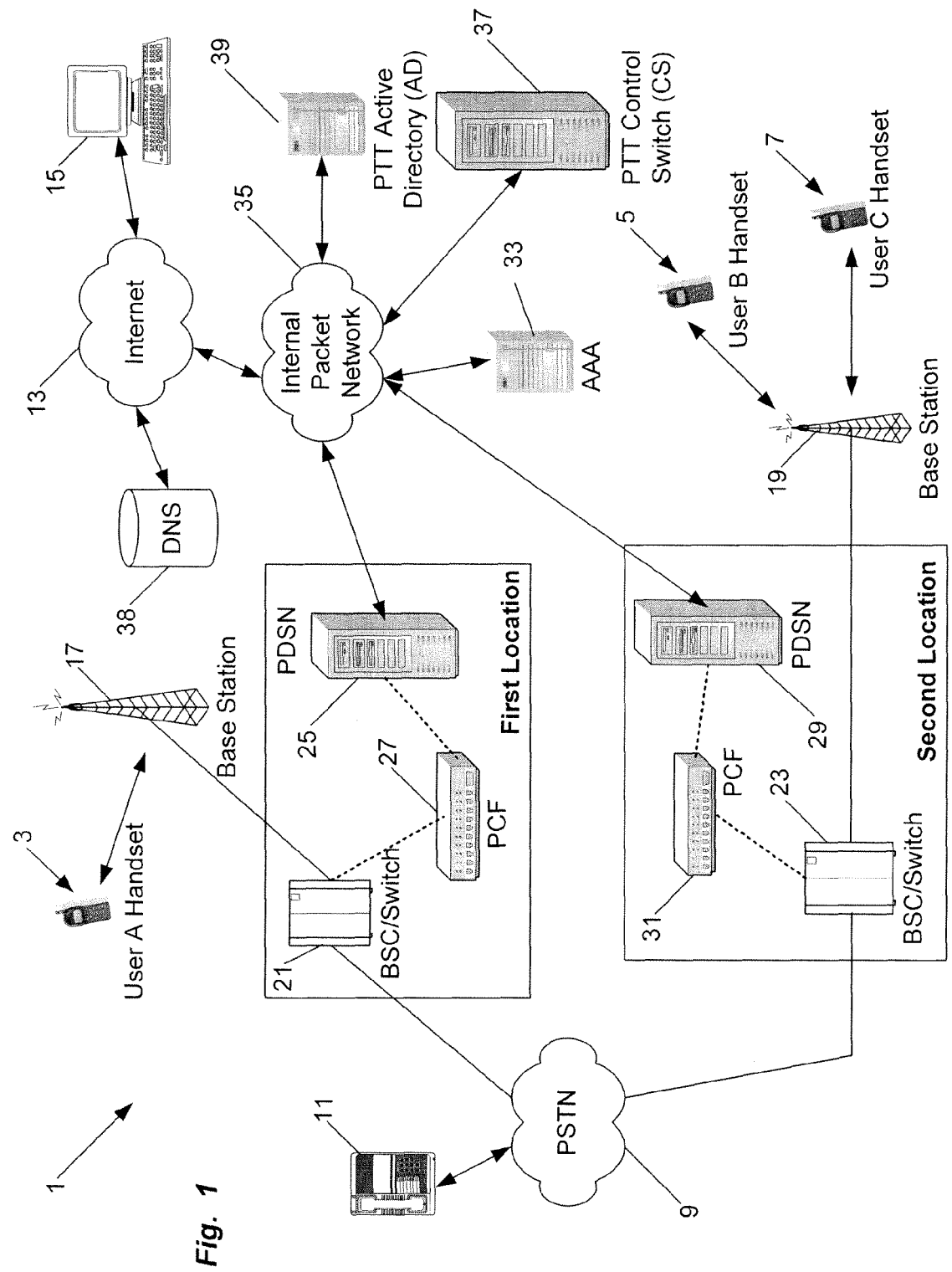

To fully appreciate these teachings it may be helpful to consider an example of a network and client devices implementing a PTT communication. Reference now is made in detail to the examples illustrated in the accompanying drawings and discussed below. FIG. 1 illustrates the functional elements of a wireless communication network that supports mobile packet data communications and preferably supports mobile voice communications.

The present concepts are applicable to a variety of different wireless networks supporting packet data communications services, such as GSM/GPRS, UMTS, etc., as may be implemented in a variety of different frequency bands. A logical evolution of IS-95A type digital wireless communications toward a 3G (third generation) implementation involves an upgrade of the digital technology toward cdma2000-1x or 1x for short. The attendant Radio Transmission Technology (1xRTT) may use a 1.25 MHz CDMA bandwidth. Although there are many benefits associated with such 1x systems, the two most significant benefits are voice capacity increase and high-speed packet data. A 1xRTT CDMA network implementation provides the ability for mobile professionals with their laptop PCs, Pocket PCs, Palm, and other wireless devices to access the Internet, their email, or corporate intranets in a wireless environment at higher data rates with broader coverage for a richer experience. Hence, the examples provide the push-to-talk and other VoIP type services in the context of a 1xRTT type network 1. The 1xRTT network 1 is chosen as an appropriate example. Those skilled in the art will recognize applicability to other types of networks, including packet only wireless networks such as WiFi, WLAN and EVDO.

Although the elements of the network 1 are generally known, to ensure a full understanding of the examples, it may be helpful to consider the general structure and operation of the network 1, before going into detail with regard to the inventive operations in that exemplary network. The communication network 1 provides mobile voice telephone communications as well as packet data services, for numerous mobile stations. For purposes of later discussion, three mobile stations 3, 5 and 7 appear in the drawing; each operated by a different user. The network 1 enables users of the mobile stations to initiate and receive telephone calls to each other as well as through the public switched telephone network (PSTN) 9 to landline telephone devices 11. The network 1 also enables users of the mobile stations to initiate and receive various data communications, for example to or from the public data network referred to as the Internet 13 to send or receive data from other digital devices represented by the exemplary personal computer 15. The network 1 provides the various wireless communication services in accord with a digital radio protocol, although for voice telephone services, the network may support the legacy analog protocol as well.

The mobile stations 3, 5 and 7 may take many forms. For example, some mobile stations may be enhanced mobile telephone stations with display and user input capabilities to support certain text and image communications, for example, for e-mail and web browsing applications. Although such mobile stations may have other form factors, today such stations typically are in the form of portable handsets 3, 5 and 7. Other mobile stations may comprise portable digital assistants (PDAs) with built-in wireless communication capabilities. As another alternative, a wireless device such as a mobile telephone having data communication capabilities may be connected to a portable computing device such as a handheld or laptop type computer.

Physical elements of one radio access network (RAN) include a number of base stations, represented by the examples at 17 and 19, which communicate over the air-link with the mobile stations 3, 5 and 7. In the example, handset 3 is currently obtaining communication service via base station 17, whereas handsets 5 and 7 are currently being serviced via base station 19. A base station typically includes a base transceiver system (BTS) coupled to antennae mounted on a radio tower within a coverage area often referred to as a "cell." The base station or base transceiver system (BTS) is the part of the radio network that sends and receives RF signals to/from the mobile stations that the base station 17 or 19 currently serves.

The network 1 also includes a number of radio access network switches. The drawing shows two of the switches 21 and 23. The switches 21, 23 are modern versions of mobile switching centers (MSCs), which support both cellular voice and packet data services. Each switch 21 or 23 connects through trunk circuits to a number of the base stations, which the respective switch controls.

The base station 17 or 19 assigns and reassigns channels to the mobile stations and monitors the signal levels to recommend hand-offs to other base stations. The network 1 typically includes a base station controller (BSC) functionality that controls the functions of a number of base stations and helps to manage how calls made by each mobile station are transferred (or "handed-off") from one serving base station to another. Each wireless network equipment vender implements this function differently. Some venders have a physical entity, which they call a BSC, while other vendors include this functionality as part of their switch 21 or 23, as shown in the example of FIG. 1.

In a 1xRTT network of the type generally shown in FIG. 1, the radio control functions of the BSC are enhanced to provide added control adapted specifically to support packet data communications over the wireless air-link interface for communications through the base station(s) 17 or 19 controlled by the particular BSC/switch 21 or 23. For example, a BSC functionality will receive a packet data service profile of each mobile station it services, and the BSC will use that profile to control certain handoff operations as well as to interact with the packet routing functionality provided through the associated PDSN 25 or 29.

The network 1 also includes a number Packet Data Serving Nodes or "PDSNs." In the illustrated example, a PSDN 25 connects to the first switch 21 via a component 27 providing a packet control function (PCF). In a similar fashion, a PSDN 29 connects to the second switch 23 via a PCF component 31. In the example, the handset obtains packet data communication service through PDSN 25, whereas handsets 5 and 7 obtain packet data service via the PDSN 29.

The PDSN is a fixed network element introduced in the wireless network architectures to support packet-switched data services. The interface between a cdma2000-1x radio access network 1 and the PDSN 25 and 29 is called the R-P Interface. Each PDSN 25 or 29 establishes, maintains and terminates logical links to the associated portion of the radio access network 1, across the R-P interface. The PDSNs also support point-to-point protocol (PPP) sessions with the mobile stations 3, 5 and 7. The PSDNs provide the packet routing function from the radio access network to/from other packet-switched networks, represented by private network 35 and the Internet 13, in the drawing.

The PDSN 25 or 29 initiates Authentication, Authorization and Accounting (AAA) communications to an AAA server 33, for example, via an internal private packet network 35, for each mobile station client seeking packet communications. Only one AAA server 33 appears in the drawing, for convenience. The servers 33 provide Authentication, Authorization, and Accounting (AAA) functions for packet data calls in a cdma2000-1x network, such as the network 1. Such servers authorize service subscriptions, service profiles, and customized services. The AAA server 33 also performs a variety of accounting functions, including starting an accounting record, maintaining an interim accounting record, and stopping an accounting record, for each packet data communication service session. The PDSN 25 or 29 receives service parameters for the mobile station, now operating as a mobile client, from the AAA server 33. The PDSN also collects usage data for accounting purposes, which it relays to the AAA server 33.

The illustrated network 1 also includes nodes 27, 31 providing the Packet Control Function (PCF). Although some implementations use the PCF to take over packet service related functions of the BSC, in the example, the PCF function converts the radio protocols into packet protocols to allow the associated PDSN to route packets in standard packet protocols via the networks 35 and 13. Hence, in the example, one office location includes a PCF processor 27 between the switch 21 and the PDSN 25; and the other exemplary office location includes a PCF processor 31 between the switch 23 and the PDSN 29. The PCF 27 relays packets and provides the necessary protocol conversions between radio communications via base stations 17 and the PDSN 25. Similarly, the PCF 31 relays packets and provides the necessary protocol conversions between radio communications via base stations 19 and the PDSN 29. The PCF 27 or 31 may provide buffering of packets, if available resources allocated to a mobile station are temporarily overloaded by a packet flow.

Although shown separately, the PCF function may be incorporated in the switch or other node that performs the BSC function, or the PCF function may be incorporated into the PDSN. In the example shown, each PCF 27 or 31 is a stand-alone packet switching node.

The illustrated network 1, in addition to normal cellular type telephone services, supports a range of packet data services. The packet data communications can support traditional data applications, such as browsing the Internet 13 and e-mail communications to/from remote computers such as personal computer 15. For purposes of the present discussion, however, the packet data communications through the network 1 can support Voice over IP (VoIP) type packet applications.

In general, VoIP communications entail digitizing and compressing audio information (typically audible speech information), and dividing the resultant data stream into portions that are encapsulated into IP packets, using an appropriate higher level protocol such as transmission control protocol (TCP). Packet switching nodes, such as the PDSN 25 or 29 and the packet switches of the networks 35 and 13, route the packets to the addressed destination. A computer or other processing device at the destination reconstructs the digital stream from the packets, decompresses the data and converts the results back to an audible output signal for presentation to the recipient end user. The VoIP applications, for example, may provide communications between a handset 3 and a landline computer 15 via the Internet 13.

One VoIP application of particular note in the commercial wireless industry provides a push-to-talk (PTT) type service for mobile handset users. A voice over IP (VoIP) implementation of a PTT service application utilizes wireless packet data service in combination with a wireline data network, such as the Internet or an intranet or extranet. Each client device of a participant has a packet-switched session linking the client device to a dispatch server, although the link may be dormant or inactive when not in use while the user is still logged on for data service through the network.

The dispatch server effectively distributes packets received from the client device of the party who has the floor (is speaking) to the device of the other person or to the devices of group members participating in the particular session. For example, if the station 3 is transmitting, the other stations on a group PTT session may be similar mobile stations 5 and 7 or data devices of various other types (e.g. PC 15) communicating with the server via the wireline data network 13 or 35. In such an example, the packet data communications for the mobile stations extend through the PDSN 25 or 29 and the carrier's internal packet network (private intranet) 35. The PTT service also supports device to device PTT communications, e.g. from station 3 to one of the other mobile stations 5 or 7, or to the PC 15.

With the mobile PTT service, a mobile station 3, 5 or 7 may be designated as the broadcaster, in response to the push-to-talk signal. This signal may be generated by actuation of an actual push-to-talk button on the particular mobile station, but often the signal is a logical control function, for example, generated in response to speech detection. The broadcasting mobile station digitizes the voice of the user, packetizes the digitized audio, and sends IP packets containing the audio to a base station 17 or 19 of the radio access network. The base station sends the data through the PDSN 25 or 29 and the data network 35, for loading thereof onto a PTT server, represented by the "PTT Control Switch (CS)" server 37 in FIG. 1. The PTT Control Switch (CS) 37 replicates packets and adds destination addresses, as necessary, to send the VoIP packets to one or more of the other stations 5 and 7 (and/or to wireline connected terminal device 15) that are currently participating in the particular PTT session. Each of the client device(s) 5, 7 and/or 15 of the other participant(s) receives and processes packets from the PTT Control Switch (CS) 37 and converts the data back to digitized voice.

The PTT Control Switch (CS) 37 also dynamically controls which participant station "has the floor" to broadcast, and thus which station or stations will receive broadcasts at any given time. The server 37 can dynamically designate any participating station as the broadcaster, and can dynamically configure any station or set of stations to receive the PTT broadcast.

As will be discussed later, the broadcasting station will configure its operations so that its transmissions are compatible with the communication capabilities of any or all of the other on-line client devices intended to receive a particular transmission. The PTT service provider will offer a mechanism to inform the mobile stations of each others' capabilities, to allow the broadcasting or sending station to select a configuration that is compatible with the intended recipient client device.

For purposes of initially establishing a PTT session, the service provider may also operate a PTT Active Directory (AD) server 39. The server 39 maintains a database of PTT subscribers and their client devices. The database may include lists for established groups for PTT communication, much like the buddy lists for instant messaging.

When subscribers' stations come on-line, the stations register as active with the PTT Active Directory server 39. For the active stations, the server 39 also maintains dynamic information regarding each station's current location, e.g. including current network address information. Assume for discussion purposes that the user of handset 3 is a member of a predefined group or has established a group or buddy list with the service provider. When the user operates a client device such as handset 3 to register for PTT communication, the station signals the PTT Control Switch (CS) 37, and the switch 37 accesses the PTT Active Directory server 39 to determine which of the other participant devices in the group or on the list (e.g. handsets 5 and 7) are on-line, and to obtain the information needed to contact each of the one or more other client devices. The server 37 communicates data regarding the on-line client devices to the handset 3.

When the user of a client device, such as the handset 3, initiates a PTT communication, the sending client device and the PTT Control Switch (CS) 37 use information from the Active Directory (AD) server 39 to invite one or more other client devices, such as stations 5 and 7, to participate in the PTT session. The other client device may be that of one of the persons on the user's buddy list. If a member of a communication group, the other client devices may be one, some or all of the devices of other members of the group. The service also allows a user to dial a station of another PTT subscriber, and set-up a PTT session on an ad hoc basis. Of course, the ad hoc call to the other station may be dialed manually or dialed automatically from the directory or phonebook stored in the calling handset.

In accord with the present teachings, registration and related signaling procedures are adapted to include communication of information or otherwise determine the communication capability of each registering client device and to exchange that information between on-line client devices. A sending station can then use this information to configure its PTT transmissions to ensure compatibility with the other on-line client device or devices intended to receive the transmissions. In a group PTT session, for example, if some mobile stations of the intended recipients can selectively receive half-rate encoded speech and full-rate encoded speech, but one or more mobile stations of intended recipients can receive only half-rate encoded speech, then the PTT broadcasting station configures its operations to send half-rate encoded speech. More detailed examples are discussed later with regard to FIGS. 4(A) to 6.

To facilitate packet switched data services, many communications rely on conversion of a high level domain name to an Internet Protocol (IP) address. Essentially, a client device sends a query containing a textual domain name to a server, and the server provides the appropriate IP address. The client device can then use the IP address to communicate with the appropriate destination equipment. For example, for packet data services, a handset 3, 5 or 7 can request a domain name translation from a Domain Naming System (DNS) server 38 accessible via the Internet 13. The DNS server 38 provides the translation from the domain or host name supplied by a caller (e.g., one of the handsets) into a complete IP address. Since each site maintains its own domain name server, no single site on the Internet is in possession of all of the translation data. The overall data constitutes a distributed database and relies on the servers at the individual sites. Access to the DNS is through a resolver and software library functions.

Of note for purposes of this discussion, a DNS lookup is used to access an appropriate PTT Control Switch (CS) server 37, offering the PTT service. Such a function in this case takes a domain name or host name for the PTT service and returns an IP address, for communications with the appropriate server. Although a single server 37 is shown for convenience, the service provider will often operate a number of such services. In an example discussed more later, a handset will use two domain names to obtain IP addresses for a primary Control Switch server and a secondary Control Switch server, from among the servers operated by the PTT service provider.

The network offers predefined Service Options for different types of calls, e.g. voice-grade telephone calls and packet-switched data communications. The Service Options typically have associated sets of radio protocol parameters, which may be specified as the default parameters for the Service Option, to support each specific service application (half-rate and full-rate with stripped headers, for voice over packet-switched data, in our example). In a common network arrangement, one such Service Option is Service Option 33 (SO33), for packet-switched data communication services; and another such Service Option is Service Option 3 (SO3) for voice-grade telephone calls. Of note for purposes of this discussion, newer mobile stations and network infrastructure also support other service options, such as SO60. This service option allows for two way communication of packets over the air link, with the packet headers removed. For example, once a session has been set-up with SO60, speech frames are transported between a mobile station 3 and the dispatch server (PTT Control Switch) 37 or from the server to recipient mobile stations 5, 7 without header information. This reduces overhead, and allows an increase in the voice quality of the VoIP service by increasing the vocoder rate to 8 kbps.

Handsets 3, 5 and 7 involved in PTT sessions may have different communications capabilities. For example, the handsets 3 and 7 may have the latest packet switched communication capabilities, e.g. to utilize SO60 and full-rate (8 kbps) vocoding on packet data communications for PTT. Such handsets may also support buffering of initial vocoded data when a user presses the PTT button. However, other handsets, such as handset 5, may have only legacy capabilities, e.g. to support only half-rate vocoding on a packet data communication session for PTT. As discussed more later, to ensure compatible operation even during initial vocoding and buffering, the PTT signaling techniques enable an exchange of information, so that for a given session, at least the broadcasting mobile station has been informed of the operational capabilities of the client device(s) of the intended recipient(s). When a station begins a PTT transmission, it can use a parameter or capability setting that is compatible with the capabilities of the other station or stations with which it will communicate during the PTT session.

During registration, a mobile station preferably will inform the push-to-talk server (37 and/or 39) of its capability. For older stations 5, the server might determine to use a default capability setting, e.g. because at least some of those stations do not provide the capability identification information as part of their registration signaling. In either case, the push-to-talk server will determine and store capability information regarding all the on-line client devices of users or subscribers to the PTT service. During registration and/or as part of later signaling, the server (37 and/or 39) forwards the capability of the registered user's station to each mobile station of a PTT-subscriber with whom the user communicates or may expect to communicate. The other client devices may be stations of other members of a group, stations of persons in the user's group of buddies, or stations or client devices of other PTT subscribers that the user calls on an ad hoc basis.

If the mobile station 3 with this new feature set interacts with a mobile station 7 having similar capabilities, e.g. a SO60 capability and full-rate vocoder capability, the user's mobile station 3 will automatically package and buffer frames at full-rate. However, if the mobile station 3 with this new feature set interacts with a mobile station 5 having only legacy half-rate vocoder capability, then the transmitting mobile station 3 can package and buffer frames at half-rate.

In the illustrated example, servers such as 37-39 are intended to represent a general class of data processing device commonly used to run "server" programming. Each such device typically runs a general server type program and one or more application programs on top of the server programming, to implement the respective functionality. Such a device typically utilizes general purpose computer hardware to perform its respective server processing and to perform the attendant communications via the network(s). Each such server, for example includes a data communication interface for packet data communication. The server also includes a central processing unit (CPU), in the form of one or more processors, for executing program instructions. The server platform also includes program storage and data storage for various data files to be processed and/or communicated by the server. The hardware elements operating systems and programming languages of such servers are conventional in nature, and it is presumed that those skilled in the art are adequately familiar therewith.

It is assumed that those skilled in the art also are familiar with the various other stations, computers, servers, packet networks and radio network nodes described above with regard to FIG. 1. However, since the mobile station determines the compatible feature (e.g. vocoder rate and/or service option) and uses the feature during the PTT session, it may be helpful to review the general structure and operation of an example of a mobile station. For purposes of discussion, it will be assumed that the station is the unit 3 in FIG. 1, although typically, the other stations 5 and 7 will have similar structures and operate in a similar manner.

FIG. 2 is a functional block diagram, and FIG. 3 is in a plan view, illustrating a telephone implementation of the mobile station 3. Although the station may be incorporated into a vehicle mounted mobile unit or into another device, such as a portable personal computer or PDA, for discussion purposes the illustrations show the station 3 in the form of a handset.

The handset embodiment of the mobile station 3 functions as a normal digital wireless telephone station. For that function, the station 3 includes a microphone 41 for audio signal input and a speaker 43 for audio signal output. The microphone 41 and speaker 43 connect to voice coding and decoding circuitry (vocoder) 45. For a normal voice telephone call, for example, the vocoder 45 provides two-way conversion between analog audio signals representing speech or-other audio and digital samples at a compressed bit rate compatible with the digital protocol of the wireless telephone network communications. The vocoder may implement different compression/decompression schemes, so as to send and receive digital audio information streams at rates selected in response to a control signal from the microprocessor control unit 51. This same vocoder 45 may be used to digitize outgoing audio signals and convert a received digital audio stream to analog, for VoIP communications, as will be discussed later.

Hence, the vocoder typically is a variable rate device capable of operation at the rate appropriate for switched voice telephone call type communications and one or more rates for voice over packet communications. In a legacy handset, however, vocoder operations may only support half-rate encoding for packet data communications of the audio information, that is to say for VoIP applications such as the PTT service. Enhanced newer versions of the handset, however, enable the variable rate vocoder to operate at several different rates for VoIP transmissions, including half-rate and full-rate vocoding. For regular voice telephone calls, the vocoder 45 operates at a 9.6 kbps rate, as the station 3 operates in an SO3 configuration. In an SO33 VoIP configuration, the vocoder 45 operates at half-rate (4 kbps). When the station uses SO60, the vocoder can operate at the 8 kbps full-rate.

For digital wireless communications, the handset 3 also includes a digital transceiver (XCVR) 57. The concepts discussed here encompass embodiments of the station 3 utilizing any digital transceiver that conforms to current or future developed digital wireless communication standards. For example, the transceiver 57 could be a TDMA or GSM unit, designed for cellular or PCS operation. Other implementations may be compatible with data only network infrastructures such as EVDO. In the present example, the digital transceiver 57 is a CDMA transceiver, of the type used in 1xRTT networks.

The transceiver 57 provides two-way wireless communication of information, such as vocoded speech samples and packetized digital message information. The transceiver also sends and receives a variety of signaling messages in support of the various services provided via the station 3 and the network 1. The transceiver 57 connects through RF transmit and receive amplifiers (not separately shown) to an antenna 58. The operational parameters of the transceiver 57 may be set, for example to utilize a specified logical channel and/or a specified radio channel configuration, in response to one or more control signals from the microprocessor 51. The station 3 may include one or more additional transceivers, as shown in dotted line form, for operation in an analog mode or in accord with an alternative digital standard.

Control of the transceiver and vocoder operations allow the station 3 to utilize different service options for packet communications. For example, if the network 1 supports SO60, the vocoder and transceiver can send and receive full-rate encoded audio data over the channel without IP headers, to provide higher quality audio. If a receiving station can not handle full-rate digitized audio or the network does not offer SO60 yet, the handset can operate the vocoder and transceiver in a standard-legacy configuration (e.g. S033 for a normal packet data service option) and still send and receive half-rate encoded audio information.

As shown, the digital telephone handset 3 includes a display 49 for displaying messages, a menu generated by a client browser program, call related information, dialed and calling party numbers, etc. A keypad 47 enables dialing digits for voice and/or data calls and generating selection inputs keyed by the user based on the displayed menu.

The microprocessor 51 controls all operations of the handset 3, including the configuration of the vococder 45 and transceiver 47 for VoIP communications via the network 1. The microprocessor 51 is a programmable device. The mobile station 3 also includes memory 53, for example a flash type read only memory (ROM), for storing various software programs and mobile configuration settings, such as mobile identification number (MIN), etc. A non-volatile random access memory (RAM) 55 serves as a working memory during execution of programs. The memories also store data, such as telephone numbers and other data input by the user via the keypad 47 as well as received data (e.g. messages) for display.

A typical implementation of the handset 3 offers a directory or phonebook of information about parties with whom the user often communicates, e.g. for speed dialing purposes, based on data stored in the memories. Of note for purposes of this discussion, the PTT signaling serves to automatically supplement stored information regarding any client devices identified in the directory or phonebook. For client devices of PTT users with whom the handset 3 conducts a PTT call, either by making a call to or receiving a call from the other device, the microprocessor will add received capability information regarding that client device to the stored directory. On a subsequent PTT call to that client device, the microprocessor 51 can use such information to select the compatible configuration for the PTT transmissions.

In a present implementation, the program memory 53 stores an operating system, device driver software, call processing software, and the like. Of note for purposes of the consideration of voice over packet communications, the memory 53 also stores client browser software 54 and vocoder manager software 56. In this example, the client software is an application level program in the form of a micro-client specifically adapted for SIP (session initiation protocol) type VoIP for call processing. The SIP micro-client program 54, for example, provides TCP/IP packet assembly and disassembly and signaling to set-up VoIP calls. The client 54 may also provide the application programming to implement the PTT service, including the exchange of client device communication capability information, discussed in more detail later.

The vocoder manager software 56 provides the executable code for the microprocessor 51 to enable control over operations of the vocoder 45. For example, during normal cellular telephone operations, the microprocessor 51 operates the vocoder 45 to digitize and compress outgoing audio and to decompress and reconvert to analog, in the format compatible with the network standard for transmission and reception via the transceiver 57 and the standard cellular air link interface. However, for VoIP functions, the microprocessor 51 controls the vocoder to operate in accord with the applicable VoIP protocol and radio link service option. In a station offering half and full rate vocoding, for example, the software controls the vocoder 45 to process digital speech samples at either the 4 kbps rate or the 8 kbps rate.

For outgoing audio, the digitized signals from the vocoder 45 go to the microprocessor for TCP/IP encapsulation and the resulting packets are sent to the transceiver 57 for wireless packet transmission. The packets may include the TCP/IP header information, or the headers may be stripped off if the current communication configuration of the station is using SO60 type service through the network 1. In the opposite direction, the transceiver 57 supplies incoming packets to the microprocessor 51 to strip any packet header/trailer bits, and the microprocessor 51 supplies the digitized audio stream to the vocoder 45 for processing.

The mobile station 3 also includes one or more elements for providing perceptible alert signals to the user. In the illustrated example (FIG. 3), the station 3 includes a tone generator 59 coupled to the speaker 43. The microprocessor 51 provides instructions to the generator 59 to generate various output tones through the speaker 43, upon occurrence of various conditions, such as a user selected ring tone in response to an incoming call or message. The station 3 will similarly output various tones in response to control signals from the PTT Control Switch (CS) 37 to indicate status of the PTT communication, for example, a beep tone to indicate that the 'floor is open' for a new broadcaster to send, or a bong tone if the station 3 attempts to broadcast after the PTT Control Switch (CS) 37 has designated another station 5 or 7 as the PTT broadcaster.

A cellular telephone implementation of the mobile station 3 may also include an input/output (I/O) port 62 coupled to the microprocessor 51. The I/O port 61 enables two-way exchange of data between the mobile station 3 and an external device, such as a portable computer, for example to allow the mobile station 3 to act as modem or the like for data communication services for the portable computer through the network 3. Such a port may also provide a mechanism for loading programming, such as 54 and 56, into memory 53.

FIG. 3 shows the front of the cellular mobile station 3, in the form of a portable handset. As shown, the handset housing includes openings 63 enabling sound to emerge from the speaker 43, as well as openings 65 to allow input of sound to the microphone 41.

The handset 3 includes the visible display screen 49. The handset 3 also includes various keys making up the keypad 47. The keypad 47 typically includes at least two sets of keys 67, 69. The keys 67 represent dialing-input keys. Typically, each of the twelve keys 67 is imprinted with a number from 1 to 0, an asterisk or star (*) or a number sign (#). Each of the keys 67 numbered 2 through 9 also is imprinted with three or four letters, to enable input of alphabetical information.

The keys 69 are function keys. The exemplary set of function keys include a menu scrolling key 73, a selection (SEL) key 71, a clear (CLR) entry key 75, a send (SND) key 77 and an END key 79. The send (SND) key 77 is used to initiate or answer a wireless call, and the "END" key 79 is used to terminate a wireless call.

Although other keys with other functions and/or labels may be used in place of or in addition to those shown, FIG. 3 shows three function keys for input of information to and retrieval of information from the processor and memory of the handset and/or selection of features from a displayed menu. One of these keys is the two-way scrolling key 73, for controlling up and down movement of a displayed cursor or highlight function and attendant scrolling of menus shown on the display 49. The exemplary keys also include the selection (SEL) key 67, which enables a user to select an option indicated by the cursor or highlighting. The clear (CLR) key 69 enables the user to erase a selection. A wide variety of other cursor controls and selection inputs could be used. The user operates a power (Pwr) key 83 to toggle the handset 3 on and off.

The keypad 47 supplies user input information to the microprocessor 51, and the microprocessor provides digital data signals to cause the display to show appropriate information to the user. Under control of the microprocessor 51, the display 49 shows textual information, such as dialed numbers and name and number information regarding stored speed dialing lists. The display 49 also may have certain specialized indicators, such as a message-waiting indicator and various roaming or home service indicators. Hence, under control of the microprocessor 51 and its programming, the keypad 47 and the display 49 provide a user interface allowing the customer to input information and receive information.

The display and attendant control of cursor and selection via the various keys enables the user to select a number of telephone features and other applications offered by the mobile station 3. Of note, the menu will offer packet data communication options, such as web browsing and e-mail, as well as one or more VoIP communication options, in this case including a PTT application.

To make a routine telephone call, a user dials in the destination number by actuating the appropriate ones of the number keys 67 and then pushes the send (SND) key 77. As the user presses the number keys, the microprocessor 51 causes the screen 49 to display the dialed number. When it senses the actuation of the send (SND) key 77, the microprocessor 51 generates a call request message in the appropriate protocol. This message includes the dialed destination number. The microprocessor 51 causes the digital transceiver 57 to send the message, as a signaling message, for example over the signaling channel of the particular wireless air-interface to a base station, for call set-up processing by the network 1. Once logged in, a user may similarly key in a number of another PTT user and press the PTT button 81, to initiate a PTT call. The user interface also allows speed dialing, menu selection and/or voice response selection of destinations, from the stored phonebook, both for normal calls and for PTT calls.

For incoming calls (or other incoming message communications), the digital transceiver 57 detects a paging message addressed to the particular mobile station on the paging channel, as received via the antenna 58. The digital transceiver 57 demodulates and decodes the paging message and forwards the message to the microprocessor 51 for further processing.

Upon receipt of the paging message, the microprocessor 51 determines the status of the mobile station 3, for example, to determine if it is otherwise engaged in an ongoing call or other ongoing communication session. If not engaged, then there is a need to alert the user. Depending on the user-selected mode of operation, the microprocessor 51 may instruct the tone generator 59 to output a selected tone through the speaker 43. In the network of FIG. 1, various types of page alert messages are received and indicated to the user for the different types of communications, including normal mobile telephone calls, incoming packet service communications, and incoming VoIP communications.

The user presses the send (SND) key 77 to answer the incoming call. In response, the microprocessor 51 terminates the alert signal(s) through the tone generator 59. The microprocessor 51 also initiates any necessary signaling through the digital transceiver 57 with the base station 17, to set-up the actual voice or packet link. For packet services, the microprocessor 51 also performs any higher level signaling necessary for the particular application, such as SIP signaling to the PTT Control Switch (CS) 37 to answer a SIP invitation and join a new PTT session.

Although many other mobile stations will be programmed to recognize other forms of PTT actuation by the user, for purposes of the PTT application, the special function keys 69 of the exemplary mobile station 3 may also include a physical PTT button 81. The micro-client 54 provides the logic for responding to operation of that button. While logged-on for PTT communication, for example, the microprocessor 51 responds to depression of the PTT button 81 to signal the PTT Control Switch (CS) 37 that the station 3 is attempting to take the floor and broadcast. With the more advanced implementation of the handset 3, the microprocessor 51 causes the vocoder 45 to begin digitizing and compressing audio at an appropriate rate; and the microprocessor 51 buffers the encoded audio data, e.g. in RAM 55. If the station is granted broadcast status, the microprocessor 51 causes the station to send digital audio in IP packets to the PTT Control Switch (CS) 37. When the user releases the PTT button 81, the microprocessor 51 causes the station 3 to signal the PTT Control Switch (CS) 37, and the microprocessor 51 changes station operation over to a receive mode. In the receive mode, the station 3 receives VoIP packetized audio and converts that to audible output signals for presentation to the user.

In the example, the PTT signal is generated by actuation of the push-to-talk button 81 on the particular mobile station 3. However, the signal may be a logical control signal generated by the microprocessor 51 in response to other conditions, for example, in response to actuation of a selected one of the other keys while the station is in the PTT mode or in response to detection of speech input by the user.

For purposes of the present discussion, it should be noted that the stored programming of the mobile station 3 also controls the registration of the mobile station with the PTT server(s) 37, 39 and the operational settings used during PTT transmission. For example, the programming controls registration communications with the PTT Control Switch (CS) 37, to provide information as to the capability of the handset 3. The programming also controls registration signaling and/or other PTT-related signaling, enabling the mobile station 3 to obtain information as to the capabilities of the client devices (e.g. handsets 5 and 7 or PC 15) of other PTT users that are on-line, to whom the user may send a PTT transmission.

It may be helpful to consider an example of the signal flow involved in a PTT registration of the handset 3. Although registrations may occur at other times and/or for other reasons, for discussion purposes, we will consider an example of a registration at time of power-up of the handset.

A 1x client device (e.g. handset) is pre-provisioned with default PTT Control Switch addresses (URLs) that will allow for the service provider to use DNS for resolution. Upon initial power-up of the PTT handset, a 1x session is established. At power-up, the handset 3 executes an authentication procedure with the AAA server 33 and obtains a dynamic assignment of an IP address for its own user, from the PDSN 25 in the example of FIG. 1. With this information, the handset 3 can obtain a destination IP address of the Primary Control Switch, through DNS resolution. The handset then uses the Primary destination IP address to send a SIP Registration message to the Control Switch. For purposes of further discussion, this process allows the handset 3 to initiate its PTT communications with the CS server shown at 37 in FIG. 1.

The Control Switch and the Active Directory are involved in determining whether the subscriber has a class of service for PTT (note currently only one CoS—provisioned or not), providing buddy and group list info, presence and maintaining version control to permit backwards compatibility. In accord with the present teachings, the registration communications also provide an opportunity for the handset to signal its communication capability to the PTT servers and obtain from the servers information as to the capabilities of client devices of other group members with whom the user may conduct a PTT communication.

Figure 4A:
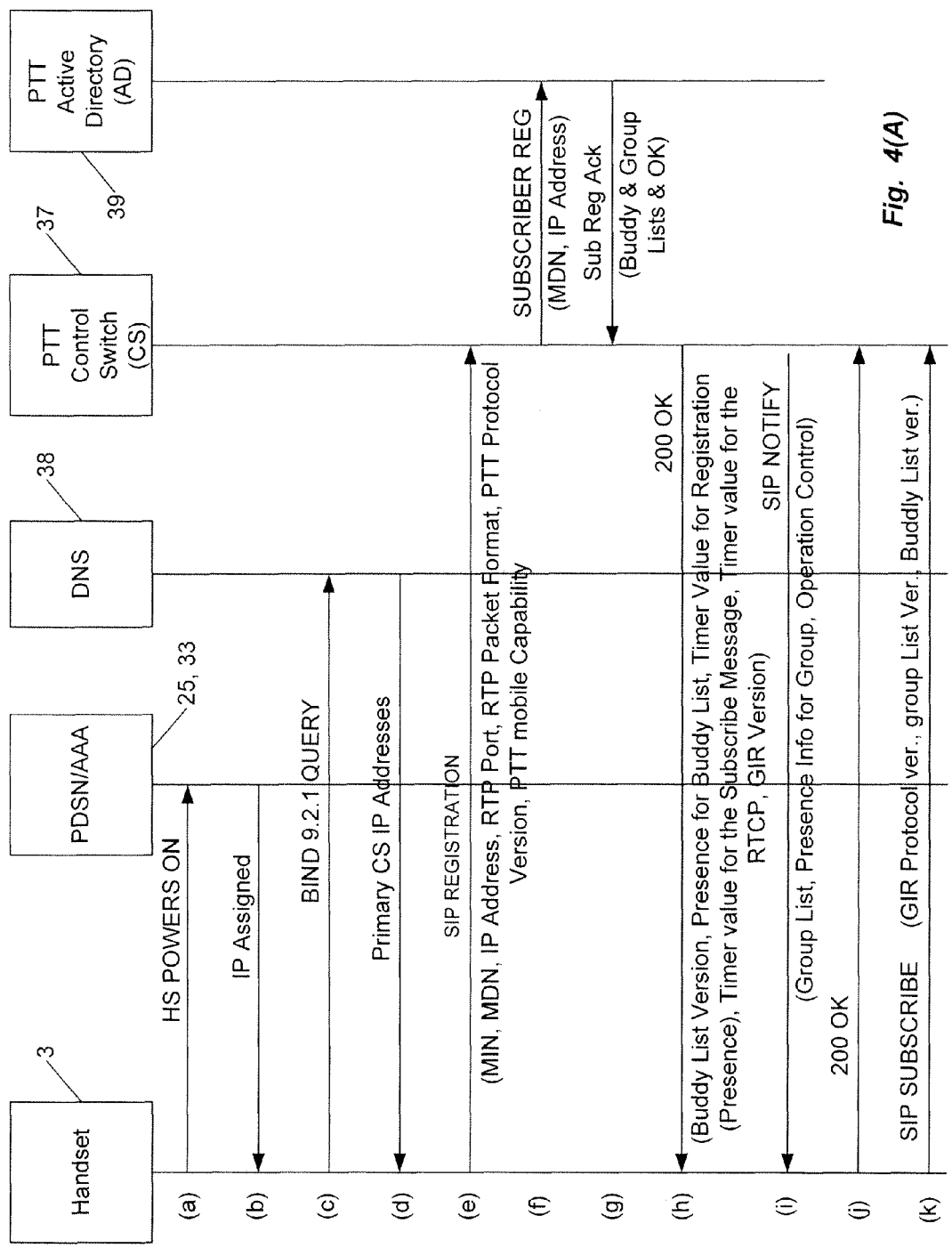
FIGS. 4(A) and 4(B) together provide a signal flow diagram useful in understanding the exchange of information in a PTT registration, including mobile station capabilities information.
Figure 4B:
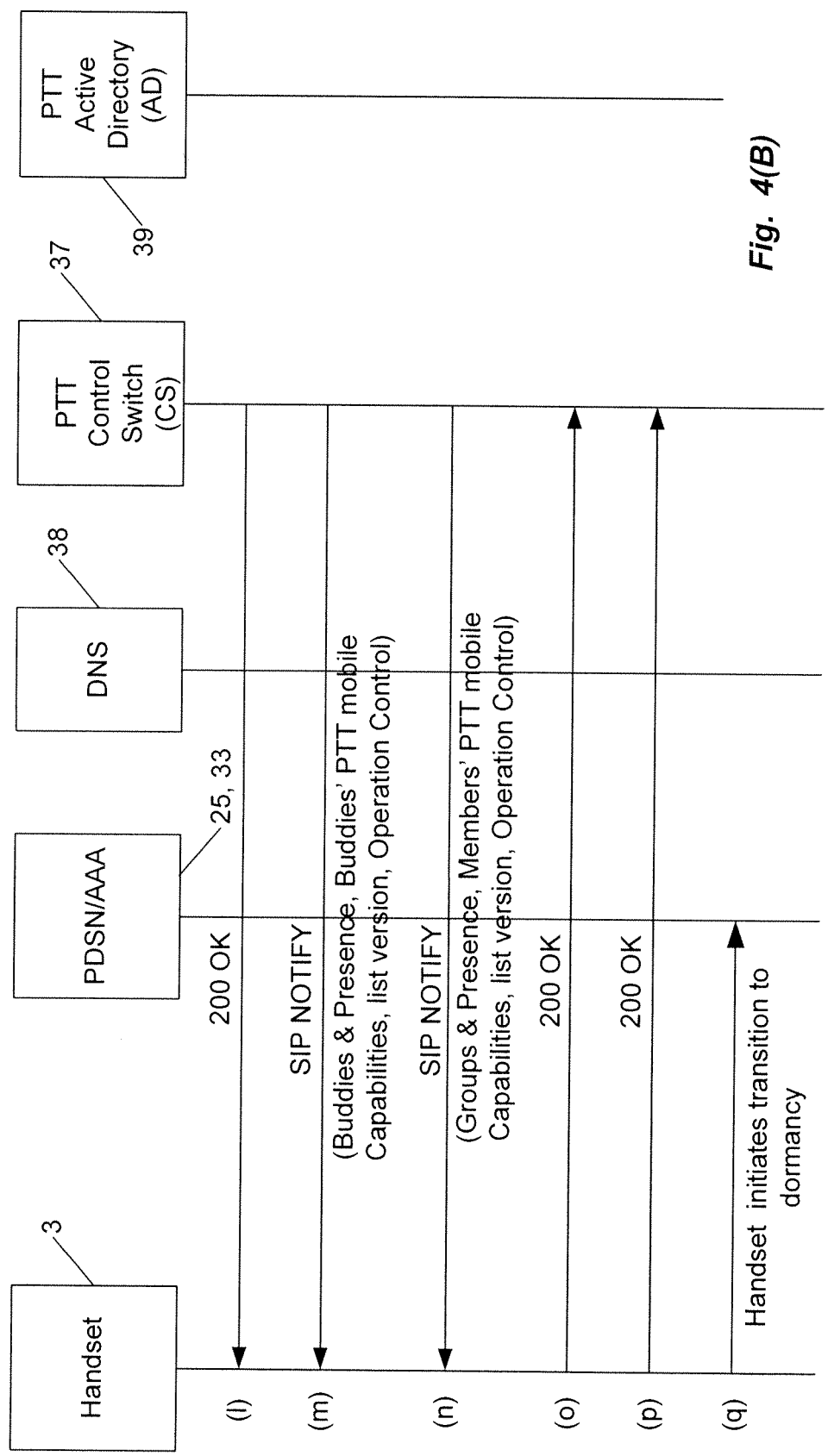
Figure 5:
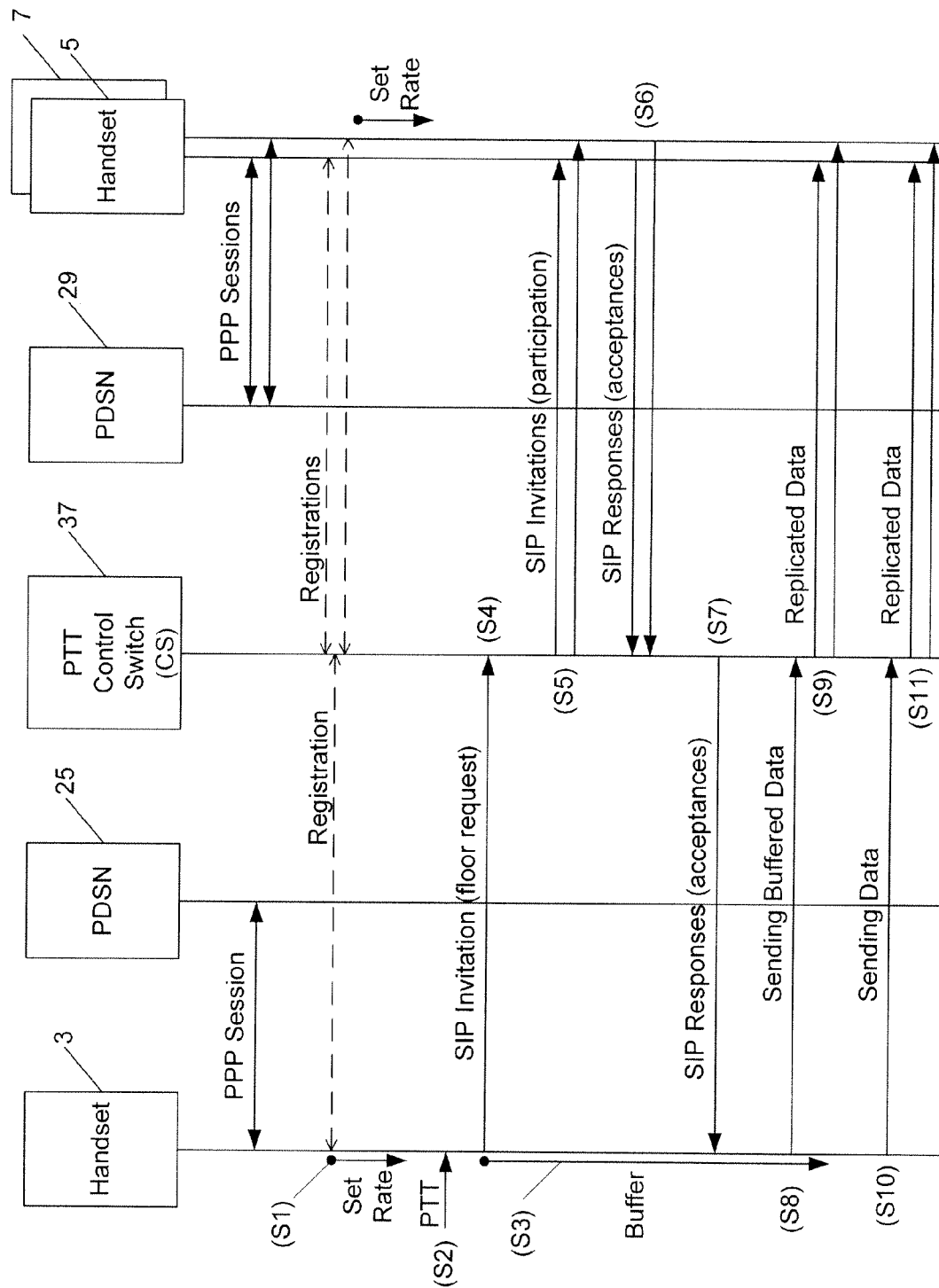
FIG. 5 is a simplified signal flow diagram useful in understanding a PTT group communication through the network of FIG. 1.

FIGS. 4(A) and 4(B) together illustrate the signal flow involved in such an initial registration procedure upon power-up. Hence, at step (a), the subscriber powers up their handset. Although similar procedures apply for other mobile stations including other handsets 5 and 7 (and possibly other types of client devices), for discussion purposes, we will assume that the registering station is the handset 3.

The handset 3 establishes a 1x session and registers with the 1x network, e.g. via the PDSN 25 and the AAA server 33. As part of this interaction, the AAA server authenticates the handset 3 and its user, for purposes of packet data communications through the network 1. For ease of illustration, authentication steps have been omitted from the drawing.

In step (b), the PDSN 25 dynamically assigns an IP address and sends that address back to the handset 3. Although not shown in detail, this initial interaction with the PDSN 25 establishes a point-to-point (PPP) session with the mobile station. The PPP session will remain 'up' as long as the mobile station is logged onto the wireless network for packet data communications. The mobile station (handset 3 in our example) sends and receives packets to/from the PDSN 25 via this session, and the PDSN routes the packets for that session to/from other packet switched network elements and to servers or end user equipment.

Using DNS Bind, the handset 3 at step (c) performs the DNS lookup mentioned earlier, for example using cs1.vzwpushtotalk.com & cs2.vzwpushtotalk.com or similar domain names for the PTT service equipment. If the handsets 3, 5 and 7 are built for use with a particular provider's services, the domain names may be provisioned in all PTT handsets at the point of manufacture. Alternatively, appropriate domain names may be programmed into the handsets when users subscribe to the PTT service or even as part of later upgrades of software and/or service provisioning data in the handset(s). The DNS lookup involves sending a BIND query to the DNS server 38. In the next step (d), the server 38 translates the domain names (xx.vzwpushtotalk.com & xx.vzwpushtotalk.com in our example), resolves on the PTT provider's domain and responds by sending back IP addresses for the Primary and Alternate Control Switches. For convenience, only one Control Switch (CS) 37 is shown in the drawings.

Next, at step (e), the subscriber's mobile station client device (handset 3 in our example), sends a SIP Registration to the Primary Control Switch (CS) 37. The message sent includes a number of pieces of information useful in setting up the service, such as the handset's MIN, mobile directory number (MDN), the assigned IP Address, Real-time Transport Protocol (RTP) Port, RTP Packet Format and PTT Protocol Version. Of note for purposes of the present discussion, this message will also include data specifying the PTT mobile capability of the subscriber's handset 3.

The Control Switch (CS) 37 issues a SIP Subscriber Registration message to the Active Directory (AD) 39 and provides the subscriber's MDN and IP Address to the Active Directory (AD) 39 (step (f)). In this message, the Control Switch (CS) 37 may also inform the Active Directory (AD) 39 of the PTT mobile capability of the subscriber's handset 3, e.g. for relay to other group members' handsets.

Next, in step (g), the Active Directory (AD) 39 responds with a Subscriber Registration Acknowledgment message, containing the subscriber's Buddy and Group List information. For example, this message will indicate to the Control Switch (CS) 37 the handsets (e.g. 5 and 7) of other group members (on the Buddy List and/or Group List) that are currently registered as on-line with the PTT service. The Buddy List typically is a list of individuals with whom the user routinely conducts individual one-to-one PTT sessions, similar to the buddy lists that are common in instant messaging services. The Group list typically is a list of individuals (or their client devices) having a commonality of interest or purpose, e.g. a work group or business team, with whom the user may communicate individually or collectively via the PTT service.

In accordance with the present teachings, this message will further include the PTT mobile capabilities of the various stations of each client device of a member of either of the Lists, that is currently registered with the PTT Active Directory (currently on-line with regard to the PTT service). The capability information will include at least that for any mobile stations of members in the list or lists, e.g. handsets 5 and 7 in our example. The capability information may also indicate capability of one or more other client devices, e.g. PC 15, if used by an on-line member of the group.

In the next step (h), the Control Switch (CS) 37 uses information it received in step (e) to respond to the client handset 3 with a 200 OK acknowledgement that the REGISTRATION message was received and accepted. The SIP REGISTRATION message includes an indication of the Buddy List Version, the Presence for Buddy List, a Timer Value for Registration (Presence), a Timer value for the Subscribe Message, a Timer value for the Real-time control protocol (RTCP), and an identification of the global instant rendezvous (GIR) protocol version. If the handset 3 receives a buddy/group list version from the server 37, which is lesser than the version of the buddy/group list that it locally stores, it will invalidate the list and send a SUBSCRIBE with a buddy/group list version of 0. In other words, it will download the entire list.

In step (i), immediately following the 200 OK message for the SIP Registration, the Control Switch (CS) 37 sends the handset a SIP Notify message, if the user has groups provisioned in the PTT Active Directory (AD) 39. At (j), the client handset 3 confirms receipt of the NOTIFY message with a 200 OK message. If the SIP Notify buddy and/or group information is corrupted or cannot be parsed (e.g., CS sends 151 buddies or 51 groups), the client handset 3 will reject it, and the handset will not update the new version of the list.

The client handset 3 may then issue a SIP Subscribe message request (step (k)) to the Control Switch (CS) 37, if it detects that the Control Switch has a newer version of the group or buddy list based on the messages received in the previous two transactions from the Control Switch. In step (l), the Control Switch (CS) 37 acknowledges receipt of the SIP Subscribe Message with a 200 OK message.

The Control Switch (CS) 37 sends a SIP NOTIFY request to the handset 3. There is one logical SIP NOTIFY message for the Buddy list and one logical SIP NOTIFY message for the Group list. Hence, at (m), the Control Switch issues a SIP NOTIFY message to the handset 3 to supply Buddy List information; and at (n), the Control Switch issues a SIP NOTIFY message to the handset 3 to supply Group List information. Of note, each of these messages identifies the handsets and possibly other client devices of the active/on-line members of the respective list; and for at least each on-line handset 5 and 7, it provides that handset's capabilities to the handset 3 of the newly registering user (in this case to the handset the user just powered-up).

At (o), the client device handset 3 acknowledges receipt of the SIP NOTIFY message for the buddy list by sending back a 200 OK message. Similarly, at (p) the client device handset 3 confirms receipt of the SIP NOTIFY for the group list by sending back a 200 OK message. At step (q), the handset forces dormancy, while it waits for a user or another member's station to start a PTT communication.

Hence, the newly powered-up handset 3 is now registered and ready to conduct or participate in a PTT communication session. Of note, the handset has provided information as to its capabilities to the PTT servers 37 and 39, and the PTT Active Directory (AD) 39 will push that information to other group or buddy list members' client side devices, e.g. as part of the signaling to update lists in the other member client devices to indicate that the handset 3 has newly come on-line. The servers also can communicate that information to client devices that participate in ad hoc PTT calls (individual party-to-party dial-up calls) with the handset 3, for use in later PTT sessions.

During registration, the handset 3 also received information as to the capabilities of other client devices (handsets 5 and 7 in our example) of PTT users that are on-line and are identified in this user's list information; and the handset 3 can store that information, e.g. in RAM 55. The station 3 will also receive similar information regarding other stations that may not be on the group or buddy list, as the mobile station 3 conducts PTT communications therewith. Hence, the handset microprocessor 51 can scan the stored capability information for the on-line devices from the lists or from previous PTT calls and set operation of this handset to a common denominator that is compatible with the other on-line users' equipment.

In a transmission to two or more client devices, for example, if one member's on-line handset 5 is a legacy mobile station with only half-rate vocoding capability, the station 3 initiating the PTT communication can set its initial operations to half-rate vocoding. Of note, if the initiating station has buffering, it will vocode initial voice information using half-rate vocoding, buffer the half-rate vocoded data and send the buffered data when the session set-up is complete. Receiving stations, including the one that is only capable of half-rate vocoding can receive and decode the data in the normal manner. Hence, there is no loss of buffered data while the stations determine compatible rates/modes of operation.

It may be helpful to consider signal flows involved in several such PTT transmissions. First, we will consider a three-way communication with respect to the simplified signal flow diagram of FIG. 5. In this example, the handset 3 will initiate the PTT communication, to two other handsets 5, 7 of members of the user's Group list, although a similar procedure may be followed for a transmission to a single client device of a user on the Buddy list. The three handsets have previously established PPP sessions through the respective PDSNs and have registered with the PTT servers 37 and 39, using procedures such as those outlined above.

In most cases, a registration message will provide the capability information to the servers, e.g. as in the cases of handsets 3 and 7. However, there may be some cases where the registration does not provide a positive transmission explicitly providing capability information to the PTT server(s). For example, if the handset 5 is a legacy device, it may not support the signaling communication regarding its communication capabilities. For any client device that does not provide such information, the server 37 will assume the default condition applies, e.g. that the client device is only capable of half-rate vocoding. The PTT Control Switch (CS) server 37 will inform the Active Directory (AD) server of the default capability, and the communications of capability information to the client devices of the other members (e.g. to handsets 3 and 7) will indicate the default capability with respect to the handset 5.

Hence, in the example, the calling handset 3 has received the information regarding communication capability of the other stations 5 and 7 from the PTT Control Switch (CS) 37, via the registration procedure outlined above or a later update of the buddy list as stations of other members come on line. For discussion, assume that the handsets 3 and 7 have relatively advanced capability, e.g. to use either half or full rate vocoding and service options S033 and S060, however, the other handset 5 has only the older capability to support half-rate vocoding via service option S033. The calling handset 3 has been informed that the handset 5 may have only the legacy capability, although the servers may have identified that capability either from positive signaling from the handset 5 or by setting the default in the absence of a positive indication of other capability.

The sending client device, that is to say the handset 3 in our example, analyzes the received client device capability information to determine a communication configuration that is compatible with the capabilities of all of the on-line client devices of members of the group. Hence, at (S1), the handset 3 sets its operational parameters (its sending configuration) for PTT communications to those for the level of operation that is compatible with the capabilities all of the handsets 3 and 7, e.g. half-rate vocoding. The handset 7 may similarly set its vocoder rate to half-rate. Of course, those skilled in the art will recognize that the capability information and settings may relate to other communication parameters or combinations of parameters. For example, the selection of vocoder rate may also entail a selection of service option. For ease of discussion, this example relates to setting of vocoder rate.

At a later time, the user pushes the PTT button 81 on the handset 3 (at S2), to initiate a push-to-talk type transmission. In response, the handset 3 begins buffering vocoded audio signals (S3) for later communication after the call is set-up to the other handsets 5 and 7. Of particular note, this initial buffering is of data vocoded at the compatible rate, in this example at the half-rate.

Assuming that the handset 3 has been dormant, it is necessary to bring the data channel through the wireless part of the network back up. However, activating the channel in the wireless part of the network uses standard signaling, and the signaling involved is omitted from the drawing for simplicity. It should be noted however, that the channel set-up can set a compatible service option, S033 in our example.

In response to the activation of the PTT button 81, the handset 3 initiates signaling to the PTT Control Switch (CS) 37 to effectively call the stations (handsets 5 and 7) of the other on-line group members. This signaling usually entails a SIP invitation, which also serves as a request to the server 37 to grant the caller station 3 access to the "floor." The typical PTT call set-up involves the handset 3 sending one or more SIP signaling messages (at (S3)), using the PPP session to the PDSN 25; and the PDSN 25 routes the packet(s) for the SIP call set-up signaling as IP packets, through the network 35 to the PTT Control Switch (CS) 37. There may be a number of SIP signaling messages relating to the PTT call set-up sent back to the mobile station 3 from the PTT Control Switch (CS) 37, however, only the initial SIP invitation signaling message transmission is shown at (S4), for convenience.

As noted in the discussion of FIG. 4(A), the PTT Control Switch (CS) 37 communicated with the PTT Active Directory (AD) server 39 to obtain information as to on-line client devices of other members of the relevant group. The information includes currently assigned IP addresses for the other client device, in this example for the handsets 5 and 7. At (S5), the PTT Control Switch (CS) 37 uses the information from the directory server 39 to invite the other stations 5 and 7 to participate in the PTT session, by sending appropriate SIP invitation messages through the PPP sessions and the respective wireless network links to the handsets 5 and 7.

Assuming that the handsets 5 and 7 are on-line but dormant, the stations are paged and interact with the wireless network elements to bring up respective wireless data channels. The legacy station 5, for example, obtains data service via an S033 channel configuration. Based on the member compatibility setting, the station 7 may also use an S033 configuration. However, activating these channels in the wireless part of the network uses standard signaling, and the signaling involved is omitted from the drawing for simplicity.

Using the radio links for packet service and the existing PPP sessions, the SIP invitations can be communicated from the PTT Control Switch 37 through the various network elements to the handset 3 and the handset 7 (at (S5)). At least one SIP response message is sent back from each of the handsets 5 and 7, via the respective PPP session (S6), and the PDSN 29 routes the IP packet(s) for that response through the network 35 to the PTT Control Switch (CS) 37. Each response signifies that the particular handset has accepted the new PTT call. A number of SIP signaling exchanges may occur between each handset 3 or 7 and the Control Switch, although only the invitations (S5) and responses (S6) are shown for convenience.

When SIP call set-up is otherwise complete, the PTT Control Switch (CS) 37 signals this status to the mobile station 3. In the example, the PTT Control Switch (CS) 37 sends a SIP response message as one or more IP packets through the data network 35 (S7); and the PDSN 25 routes the packet(s) for the SIP response message over the existing PPP session and the packet data radio link carrying that session, to the handset 3.

The handset 3 can now begin sending digitally encoded audio data. In the example, the handset initially sends packets containing buffered data through the PPP session to the PDSN 25, which in turn relays the packets through the network to the PTT Control Switch (CS) 37, as shown at (S8) in FIG. 5. The PTT Control Switch (CS) 37 replicates each of these packets and adds destination addresses, as necessary, to send the packets to the other handsets 5 and 7 (S9). The stations 5 and 7 of the other group members receive and process the packets from the PTT Control Switch 37 and convert the data back to digitized voice. In this case, the handset 5 has only half-rate vocoder capabilities, but the buffered packets were in fact encoded at that rate by the sending handset 3. Hence, the handset 5 can decode the buffered data and provide appropriate audio output. The other handset 7 can operate at either vocoder rate (half or full), so it also can decode the half-rate buffered data and provide appropriate audio output.

After transmission of the buffered data, the handset 3 sends any additional audio input information as half-rate vocoded data in packet transmissions to the PTT Control Switch (CS) 37, as shown at (S10). The PTT Control Switch (CS) 37 replicates each of these packets and adds destination addresses, as necessary, to send the packets to the other handsets 5 and 7 (S11). The handsets 5 and 7 receive and decode the additional VoIP information, essentially as was done for the buffered data.

Next, we will consider the signal flow in an ad hoc call, that is to say a PTT call from one client device to another, that is set-up on a dial-up basis, without use of the group list or buddy list from the server (although the dialing may use auto-dialing from the calling station's stored directory information). Attention is directed to FIG. 6.

For discussion, we will again assume again that the handsets 3 and 7 have relatively advanced capability, e.g. to use either half or full rate vocoding and service options S033 and S060, however, the other handset 5 has only the older capability to support half-rate vocoding via service option S033. In this example, the handset 3 will initiate the PTT communication, to just one other handset. Although only one destination will be involved in this PTT call, the discussion below will refer to handset 5 and handset 7 as alternative possible destinations, as differences in the two illustrative handsets are useful in understanding certain aspects of the procedures.

The calling handset 3 has previously established a PPP session through the respective PDSNs and registered with the PTT servers 37 and 39, using procedures such as those outlined above. In a similar manner, the destination client device, that is to say either handset 5 or handset 7, has previously established a PPP session through the respective PDSNs and registered with the servers, using procedures such as those outlined above. From these registration procedures, the servers have determined the communication capabilities of the two stations. However, because the two stations that will participate in this ad hoc PTT session are not associated with each other on the basis of a group or buddy list defined at the server(s), the servers have not yet provided the capability information of the destination station 5 or 7 to the station 3 that will initiate the PTT call in this example.

At step (S21), the user of the handset 3 dials the number of the destination client device (or selects the destination from a speed dial list or the like stored in memory). At (S22), the user presses the PTT button on the handset 3, to start a call to the selected destination device. At this point in the example, we will assume that this is the first PTT call to the particular destination client device.

At this stage of the process, the calling handset 3 has not received the information regarding communication capability of the selected destination client device, therefore it is not yet aware whether it is calling to a device with the more limited capabilities like mobile station 5 or to a device like the mobile station 7 with the more advanced capabilities. Hence, on this first call to the particular destination, the microprocessor within the handset 3 sets the communication configuration (step (S23)) to the default that should be compatible with any client device, that is to say so as to use SO33 and half-rate vocoder operation in the example. Again, those skilled in the art will appreciate that the communication configuration settings may relate to other communication parameters or combinations of parameters.

At step (S24), the handset 3 begins buffering vocoded audio signals (S3) for later communication after the call is set-up to the destination client device, that is to say to either handset 5 or to handset 7 in this example. Of particular note, this initial buffering is of data vocoded at the compatible default rate. Assuming that the handset 3 has been dormant, it is necessary to bring the data channel through the wireless part of the network back up. However, activating the channel in the wireless part of the network uses standard signaling, and the signaling involved is omitted from the drawing for simplicity. It should be noted however, that the channel set-up can set a compatible service option, which will be the default S033 for the first call in our example.

At step (S25), the handset 3 initiates signaling to the PTT Control Switch (CS) 37 to effectively call the selected destination station. This signaling usually entails a SIP invitation, which also serves as a request to the server 37 to grant the caller station 3 access to the "floor." The typical PTT call set-up involves the handset 3 sending one or more SIP signaling messages (at (S25)), using the PPP session to the PDSN 25; and the PDSN 25 routes the packet(s) for the SIP call set-up signaling as IP packets, through the network 35 to the PTT Control Switch (CS) 37. There may be a number of SIP signaling messages relating to the PTT call set-up sent back to the mobile station 3 from the PTT Control Switch (CS) 37, however, only the initial SIP invitation signaling message transmission is shown at (S4), for convenience.

The PTT Control Switch (CS) 37 accesses the PTT Active Directory (AD) server 39 to determine if the intended destination (e.g. handset 5 or handset 7) is currently on-line. For example, the PTT Control Switch (CS) 37 launches a query (at step (S26)) through the network 35 to the PTT Active Directory (AD) server 39 requesting status and location information for the destination client device dialed by the user of handset 3. If the directory database in the server 39 indicates that the destinations is active, the server 39 transmits a response (at step (S27)) back to the PTT Control Switch (CS) 37 via the network 35. The response contains any data needed to contact the selected destination station at its current location in the network 1 (or in a visited remote radio access network—not shown). For example, the response may provide the IP address assigned to the destination station by the radio access network that is currently serving a selected destination mobile device.

In the next step (S28), the PTT Control Switch (CS) 37 uses the information from the directory server 39 to invite the destination client device to participate in the PTT session, by sending an appropriate SIP invitation message through the PPP session and the wireless network link to the called client device, that is to say to either handset 5 or to handset 7 in our example.

Assuming that the destination handset is on-line but dormant, the station is paged and interacts with the wireless network elements to bring up a wireless data channel for this VoIP call. At this stage, the called destination obtains data service via an S033 channel configuration (default). Activating this channel in the wireless part of the network uses standard signaling, and the signaling involved is omitted from the drawing for simplicity. Using the radio link for packet service and the existing PPP session, the SIP invitation can be communicated from the PTT Control Switch (CS) 37 through the various network elements to the called client device (at (S28)). At least one SIP response message is sent back from each of the called client device, via the PPP session (S29), and the PDSN 29 routes the IP packet(s) for that response through the network 35 to the PTT Control Switch (CS) 37. The response signifies that the called client device, mobile station 5 or mobile station 7 in the example, has accepted the new PTT call. A number of SIP signaling exchanges may occur between destination client device and the Control Switch, although only the invitation (S28) and the response (S29) are shown for convenience.

When SIP call set-up is otherwise complete, the PTT Control Switch (CS) 37 signals this status to the mobile station 3. In the example, the PTT Control Switch (CS) 37 sends a SIP response message as one or more IP packets through the data network 35 (S30); and the PDSN 25 routes the packet(s) for the SIP response message over the existing PPP session and the packet data radio link carrying that session, to the handset 3.

The handset 3 can now begin sending digitally encoded audio data. In the example, the handset initially sends packets containing buffered data through the PPP session to the PDSN 25, which in turn relays the packets through the network to the PTT Control Switch (CS) 37, as shown at (S31) in FIG. 6. The PTT Control Switch (CS) 37 replicates each of these packets and adds the destination address of the called client device, as necessary, to send the packets to the destination (S32). The destination client device receives and processes the packets from the PTT Control Switch (CS) 37 and converts the data back to digitized voice.

In this case, the handset 3 buffered data vocoded at the default rate (half-rate) and used the default service option S033 to send the VoIP data packets through the network to the destination. Since this default configuration is compatible with all client devices, any client device destination station can receive, decode and process the data to produce audible output of the voice communication. For example, if the destination station is the handset 5 with only half-rate vocoder capabilities, it can handle the transmission because the buffered packets were in fact encoded at that rate by the sending handset 3. If the destination station is the other handset 7, it can operate at either vocoder rate (half or full), so it also can decode the half-rate buffered data and provide appropriate audio output.

After transmission of the buffered data, the handset 3 sends any additional audio input information as half-rate vocoded data in packet transmissions to the PTT Control Switch (CS) 37, as shown at (S33). The PTT Control Switch (CS) 37 replicates each of these packets and adds destination addresses, as necessary, to send the packets to the destination client device (S34). The destination client device receives and decodes the additional VoIP information, essentially as was done for the buffered data.

At a later time, one or the other of the stations terminates the PTT call, as represented generally at (S35) in FIG. 6, for example, by appropriate signaling in response to user activation of the 'END' button on the particular mobile station. When the call terminates, but before the radio channels are dropped, the PTT Control Switch (CS) server 37 conducts clean-up signaling with each client device (S36). Such signaling is often used to convey updates to lists, e.g. buddy or group lists, as listed users log on and off the PTT service. For listed client devices, these updates also provide updates of station capability information.

Of note for purposes of this discussion of an ad hoc call, one of the messages in this signaling to each handset also will include the capability information for the other participant in the just terminated ad hoc PTT session. For example, the server 37 will inform the handset 3 of the communication capability of the handset 5 or the handset 7. Similarly, the server may advice the destination client device (5 or 7 in this example) of the communication capability of the calling mobile station 3. Each client device will store the received capability information, for use in configuring the device during subsequent communications with the other client device. After completion of the clean-up signaling, both client devices go dormant (S37).

The procedures for a later call to the destination station are substantially the same as discussed above relative to FIG. 6. However, there is one key distinction. On the next pass (and any subsequent pass) through the call flow, when the station 3 sets the rate at (S23) and establishes a radio link with a selected service option, these configuration parameters are set based on the stored information as to the capability of the selected destination station. For example, if the user makes a second call to the handset 5, the microprocessor of the handset 3 identifies the capabilities of that handset from data stored in memory and sets the configuration to use S033 and half-rate vocoding. The buffered data is encoded at that rate (S24) and may be properly decoded when received by the handset 5 (S32). However, if the destination client device was the handset 7, when the user makes a second call to the handset 7, the microprocessor of the handset 3 identifies the capabilities of that handset from memory and sets the configuration to use SO60 and full-rate vocoding.

Aspects of the procedures outlined above are implemented in the handsets and in the server(s) providing the PTT service. Client devices, including the handsets, typically are controlled by software programming stored in memory or the like and executed by the central processing unit or microprocessor of the client device. Servers also typically are implemented by programmable general purpose computer hardware. Operations described above may be carried out by execution of software, firmware, or microcode operating on a mobile station or a computer, of any type. Additionally, code for implementing such operations may be in the form of computer instructions in any form (e.g. source code, object code, interpreted code, etc.) stored in or carried by any computer or machine readable medium.

Each of the program aspects of the technology may be thought of as a "product" typically in the form of executable code and/or associated data that is carried on or embodied in a type of machine readable medium. The executable code and/or associated data controls the operation of the client device (e.g. handset, other mobile station, or computer) or the programmable device operating as the server(s) to provide the PTT service. Media include any or all of the memory of the client devices or server platforms or associated modules thereof, such as various semiconductor memories, tape drives, disc drives and the like, which may provide storage at any time for the software programming.

All or portions of the software may at times be communicated through the Internet or various other telecommunication networks. Such communications, for example, may enable loading of the software from another computer (not shown) into the servers 37 or 39, into a handset or other mobile station or into another element, such as a web server used for software distribution or distribution of information. Thus, another type of media that may bear the software elements includes optical, electrical and electromagnetic waves, such as used across physical interfaces between local devices, through wired and optical landline networks and over various air-links of the wireless network. The physical elements that carry such waves, such as wired or wireless links, optical links or the like, also may be considered as media bearing the software.

Terms regarding computer or machine "readable medium" (or media) as used herein therefore relate to any physical medium or transmission medium that participates in providing instructions or code or data to a processor or other central processing unit for execution or processing. Such a medium may take many forms, including but not limited to, non-volatile media and volatile media as well as carrier wave and physical transmission media.

Those skilled in the art will recognize the above discussion of PTT registration and call set-up procedures are exemplary only. The techniques may be modified, or used in different applications. The present concepts, for example, may be applicable to other VoIP communications involving mobile wireless stations.

In the example, one of the servers accumulated capability data for all group members' client devices and distributed that data to client devices, for use when any of the devices transmitted. If a client device did not provide capability data, the server applied a default. Alternatively, the server could collect and distribute capability data for those devices supporting the appropriate signaling. A mobile station receiving a list from the server that included a device, for which the server does not indicate capability, would assume that such a listed device has only the default capability.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Appendix (List of Acronyms)

The description above has used a large number of acronyms to refer to services, protocols and system components. Although generally known to those involved in the mobile wireless communication industry, use of some of these acronyms may not be standardized in the art. For convenience of the reader, the following list correlates terms to acronyms as used in the Detailed Description above.

Active Directory (AD)
Authentication, Authorization and Accounting (AAA)
Base Station Controller (BSC)
Base Transceiver System (BTS)
Code Division Multiple Access (CDMA)
Control Switch (CS)
Domain Naming System (DNS)
Electronic Serial Number (ESN)
Evolution Data Only (EVDO)

General Packet Radio Service (GPRS)
General System for Mobile (GSM)
Global Instant Rendezvous (GIR)
Internet Protocol (IP)
Mobile Directory Number (MDN)
Mobile Identification Number (MIN)
Mobile Switching Center (MSC)
Packet Control Function (PCF)
Packet Data Serving Node (PDSN)
Personal Computer (PC)
Personal Communication Service (PCS)
Point-to-Point Protocol (PPP)
Portable Digital Assistant (PDA)
Public Switched Telephone Network (PSTN)
Push-to-talk (PTT)
Radio Access Network (RAN)
Random Access Memory (RAM)
Read Only Memory (ROM)
Real-time Control Protocol (RTCP)
Real-time Transport Protocol (RTP)
Service Option (SO)
Session Initiation Protocol (SIP)
Time Division Multiple Access (TDMA)
Transmission Control Protocol (TCP)
Transmission Control Protocol/Internet Protocol (TCP/IP)
Universal Mobile Telecommunication System (UMTS)
Voice over Internet Protocol (VoIP)
Wireless Local Area Network (WLAN)

What is claimed is:

1. A method comprising steps of:
registering a mobile station and a plurality of client devices with equipment of a service provider of a voice over packet communication service prior to a respective first push to talk (PTT) session for the mobile station and the plurality of client devices, the registering including transmitting information indicating respective communication capabilities of the mobile station and the plurality of client devices to the equipment of the service provider when the mobile station and the plurality of client devices are capable of transmitting their respective communication capabilities, the transmitted communication capabilities of the mobile station and the plurality of client devices being at least one of hardware and software capabilities inherent to the mobile station and the plurality of client devices prior to the respective first PTT session; and
transmitting, during a PTT session subsequent to the registration, packets of digital audio information from the mobile station through a mobile wireless communication network, for communication to one client device of a plurality of client devices, using:
a default communication capability when, prior to the PTT session subsequent to the registration, either the mobile station does not receive the communication capabilities of the one client device from the service provider or the service provider indicates prior to the PTT session subsequent to the registration to use the default communication capability, and
communication capabilities of the one client device that are compatible with communication capabilities of the mobile station when, prior to the PTT session subsequent to the registration, the mobile station receives the communication capabilities of the one client device from the service provider prior to the PTT session subsequent to the registration;
when the default communication capability is used during the PTT session subsequent to the registration, switching from transmitting using the default communication capability during the PTT session subsequent to the registration to transmitting using the communication capabilities of the one client device that are compatible with communication capabilities of the mobile station during another PTT session with the one client device in response to the service provider indicating to the mobile station to use, during the another PTT session, the communication capabilities of the one client device.

2. The method of claim 1, wherein the mobile station and the one client device are associated as members of a group defined by a list in the equipment of the service provider.

3. The method of claim 1, wherein the transmitting of packets of digital audio information through the mobile wireless communication network is intended for communication to the plurality of client devices.

4. The method of claim 3, wherein:
the plurality of client devices comprise mobile stations, and
the selected communication configuration corresponds to a communication capability common to the mobile station client devices.

5. The method of claim 4, wherein the selected communication configuration implements vocoding of the audio information at a rate that is compatible with a vocoder rate that is common to the mobile station client devices.

6. The method of claim 4, wherein:
the transmitting of the packets of digital audio information using the selected communication configuration utilizes a radio link service option, selected from a plurality of service options available in the mobile wireless communication network, and
the selected service option is compatible with a common receiving capability of the mobile station client devices.

7. The method of claim 4, wherein the step of transmitting the packets of digital audio information using the selected communication configuration sends the digital audio information to the equipment of the service provider for distribution to the mobile station client devices, so as to provide a push-to-talk service.

8. The method of claim 1, wherein the step of transmitting the packets of digital audio information using the selected communication configuration sends the digital audio information to the equipment of the service provider for distribution to the one client device, as to provide a push-to-talk service.

9. The method of claim 1, wherein the registering comprises an exchange of Session Initiation Protocol (SIP) messages with the equipment of the service provider.

10. A system comprising:
a radio access network for providing wireless mobile packet data communications for a plurality of mobile stations, at least some of the mobile stations having a plurality of different packet communication capabilities;
a server coupled to the radio access network for distributing packets of digitized audio for an audio over packet communication received from a broadcasting mobile station, which have been communicated through the radio access network to a mobile station client device intended to receive the audio over packet communication,
wherein the server receives registration information from the broadcasting mobile station and the mobile station client device prior to a respective first push to talk (PTT) session between the broadcasting mobile station and the mobile station client device, the registering including receiving information indicating respective communication capabilities of the broadcasting mobile station and the mobile station client device when the broadcasting mobile station and the mobile station client device are capable of transmitting their respective communication capabilities to the server, the received communication capabilities of the broadcasting mobile station and the mobile station client device being at least one of hardware and software capabilities inherent to the broadcasting mobile station and the mobile station client device prior to the respective first PTT session, wherein the broadcasting mobile station transmits, during a PTT session subsequent to the registration, packets of digital audio information to the mobile station client device, using:
- a default communication capability when, prior to the PTT session subsequent to the registration, either the broadcasting mobile station does not receive the communication capabilities of the mobile station client device from the server or the server indicates prior to the PTT session subsequent to the registration to use the default communication capability, and
- communication capabilities of the mobile station client device that are compatible with communication capabilities of the broadcasting mobile station when, prior to the PTT session subsequent to the registration, the broadcasting mobile station receives the communication capabilities of the mobile station client device from the server prior to the PTT session subsequent to the registration, and wherein when the default communication capability is used during the PTT session subsequent to the registration, switching from transmitting using the default communication capability during the PTT session subsequent to the registration to transmitting using the communication capabilities of the mobile station client device that are compatible with communication capabilities of the broadcasting mobile station during another PTT session with the mobile station client device in response to the server indicating to the broadcasting mobile station to use, during the another PTT session the communication capabilities of the mobile station client device.

11. A call processing method comprising steps of:

receiving, by a server, registration information from a mobile device and one client device of a plurality of client devices configured for voice over packet communication via a radio access network prior to a respective first push to talk (PTT) session for the mobile station and the plurality of client devices, the registration including receiving information indicating respective communication capabilities of the mobile station and the one client device when the mobile station and the one client device are capable of transmitting their respective communication capabilities, the received communication capabilities of the mobile station and the one client device being at least one of hardware and software capabilities inherent to the mobile station and the one client device prior to the respective first PTT session; and transmitting, during a PTT session subsequent to the registration, packets of encoded voice from the mobile station through the radio access network, for communication to one client device, using:
- a default communication capability when, prior to the PTT session subsequent to the registration, either the mobile station does not receive the communication capabilities of the one client device from the server or the server indicates prior to the PTT subsequent to the registration to use the default communication capability, and
- communication capabilities of the one client device that are compatible with communication capabilities of the mobile station when, prior to the PTT session subsequent to the registration, the mobile station receives the communication capabilities of the one client device from the server prior to the PTT session subsequent to the registration;

when the default communication capability is used during the PTT session subsequent to the registration, switching from transmitting using the default communication capability during the PTT session subsequent to the registration to transmitting using the communication capabilities of the one client device that are compatible with communication capabilities of the mobile station during another PTT session with the one client device in response to the server indicating to the mobile station to use, during the another PTT session the communication capabilities of the one client device.

12. The method of claim 11, wherein:
the receiving of registration information from the one client device involves an exchange of Session Initiation Protocol (SIP) messages with the one client device; and
the communication to register the mobile station includes an exchange of SIP messages with the mobile station.

13. The method of claim 11, further comprising forwarding the encoded voice packet information to another client device.

14. The method of claim 13, wherein:
the client devices comprise mobile stations, and
the voice packet information has been communicated through the radio access network in a manner that is compatible with a communication capability that the mobile station client devices provide in common.

15. The method of claim 14, wherein the encoded voice packet information has been vocoded at a rate that is compatible with the communication capability of the mobile station client devices.

16. The method of claim 11, wherein:
subscribers associated with the one client device and the mobile station are members of a pre-defined group; and
the set-up of voice over data-packet communication is between members of the pre-defined group.

17. The method of claim 11, wherein the set-up of voice over data-packet communication is done on an ad hoc basis between subscribers associated with the one client device and the mobile station.

* * * * *